(12) United States Patent  
 Wu

(10) Patent No.: US 10,922,479 B2  
(45) Date of Patent: Feb. 16, 2021

(54) METHOD AND ELECTRONIC DEVICE FOR CREATING AN ELECTRONIC SIGNATURE

(71) Applicant: THINKCLOUD DIGITAL TECHNOLOGY CO., LTD., Taichung (TW)

(72) Inventor: Yu-Jen Wu, Taichung (TW)

(73) Assignee: THINKCLOUD DIGITAL TECHNOLOGY CO., LTD., Taichung (TW)

(*) Notice: Subject to any disclaimer, the term of this patent is extended or adjusted under 35 U.S.C. 154(b) by 0 days.

(21) Appl. No.: 16/403,927

(22) Filed: May 6, 2019

(65) Prior Publication Data

US 2019/0347317 A1   Nov. 14, 2019

(30) Foreign Application Priority Data

May 11, 2018   (TW) .............................. 107116100 A

(51) Int. Cl.
*G06F 40/166* (2020.01)
*G06T 11/60* (2006.01)
*H04N 5/76* (2006.01)

(52) U.S. Cl.
CPC ............ *G06F 40/166* (2020.01); *G06T 11/60* (2013.01); *H04N 5/76* (2013.01)

(58) Field of Classification Search
None
See application file for complete search history.

(56) References Cited

U.S. PATENT DOCUMENTS

| 9,798,706 B2 | 10/2017 | Wu et al. |
| 2002/0133520 A1* | 9/2002 | Tanner ................ G06F 16/40 715/202 |
| 2002/0136407 A1* | 9/2002 | Denning ............... G06F 21/10 380/258 |

(Continued)

FOREIGN PATENT DOCUMENTS

| CN | 102394754 A | 3/2012 |
| CN | 102722284 A | 10/2012 |

(Continued)

OTHER PUBLICATIONS

European Office Action for European Application No. 19172947.4, dated Jul. 3, 2020.

(Continued)

*Primary Examiner* — Howard Cortes

(74) *Attorney, Agent, or Firm* — Birch, Stewart, Kolasch & Birch, LLP

(57) ABSTRACT

A method for creating an electronic signed document from an original electronic document includes: generating a document-related image based on content of the original electronic document; displaying the original electronic document; recording a real-time video of a user as the user inputs a set of signature strokes that constitute a signature; generating a superimposition video based on the real-time video and the document-related image, wherein in the superimposition video, the document-related image overlaps apart of the real-time video; and generating an electronic signed document by embedding the superimposition video in the original electronic document.

17 Claims, 6 Drawing Sheets

(56) References Cited

U.S. PATENT DOCUMENTS

| | | | | |
|---|---|---|---|---|
| 2008/0055408 A1* | 3/2008 | Wun | ................ | H04N 1/00103 |
| | | | | 348/122 |
| 2012/0166921 A1* | 6/2012 | Alexandrov | ........ | H04L 65/4015 |
| | | | | 715/202 |
| 2012/0190405 A1* | 7/2012 | Kumaran | ............ | H04M 1/0266 |
| | | | | 455/556.2 |
| 2013/0039633 A1* | 2/2013 | Wong | ................... | H04N 9/8205 |
| | | | | 386/224 |
| 2013/0143621 A1 | 6/2013 | Kumaran | | |
| 2013/0254284 A1* | 9/2013 | Dougherty | ............... | G06F 21/00 |
| | | | | 709/204 |
| 2013/0325728 A1* | 12/2013 | Bialostok | ............... | G06Q 10/06 |
| | | | | 705/311 |
| 2014/0019762 A1* | 1/2014 | Sabin | .................. | H04L 63/0823 |
| | | | | 713/176 |
| 2014/0129255 A1* | 5/2014 | Woodson | ............... | G06Q 50/24 |
| | | | | 705/3 |
| 2014/0351133 A1* | 11/2014 | Christian | ............... | G06Q 20/40 |
| | | | | 705/44 |
| 2015/0026478 A1* | 1/2015 | Raduchel | ............. | H04L 9/3247 |
| | | | | 713/178 |
| 2015/0170309 A1* | 6/2015 | Diamond | ............. | G06Q 50/265 |
| | | | | 705/325 |
| 2015/0334339 A1 | 11/2015 | Dejene | | |
| 2016/0048696 A1* | 2/2016 | Follis | .................. | G06F 21/6209 |
| | | | | 726/28 |
| 2016/0224528 A1* | 8/2016 | Trevarthen | ............ | G06F 17/242 |
| 2017/0278212 A1* | 9/2017 | Fry | ......................... | G06Q 50/28 |
| 2018/0107818 A1 | 4/2018 | Wu | | |
| 2018/0267946 A1* | 9/2018 | Dang | ..................... | G06F 21/64 |

FOREIGN PATENT DOCUMENTS

| | | |
|---|---|---|
| CN | 107832624 A | 3/2018 |
| EP | 3428782 A1 | 1/2019 |
| WO | WO 2014/098745 A1 | 6/2014 |

OTHER PUBLICATIONS

Singaporean Office Action and Search Report for Singaporean Application No. 10201904168T, dated Nov. 7, 2019.

* cited by examiner

METHOD AND ELECTRONIC DEVICE FOR CREATING AN ELECTRONIC SIGNATURE

CROSS-REFERENCE TO RELATED APPLICATION

This application claims priority of Taiwanese Patent Application No. 107116100, filed on May 11, 2018.

FIELD

The disclosure relates to a method and a system for creating an electronic signature on an original electronic document.

BACKGROUND

U.S. Pat. No. 9,798,706 B2 discloses a conventional method for generating an electronic signature. In the conventional method for generating an electronic signature, a web server provides a webpage to be displayed on a touch screen of an electronic device, and receives from the electronic device a representative signal of a handwritten signature that is inputted by a signer and a dynamic image that presents a motion of the signer during signing the handwritten signature. The dynamic image is captured by a dynamic image capturing module of the electronic device simultaneously with the inputting of the handwritten signature. Afterward, the web server stores the dynamic image as a streaming file, compiles a data file that includes the representative signal and the streaming file, and executes the data file in the webpage as an electronic signature.

SUMMARY

One object of the disclosure is to provide a method for creating an electronic signature on an original electronic document.

According to one embodiment of the disclosure, the method is implemented using an electronic device that includes a processor, an image capturing component and an input/output module including a display component. The method includes steps of:
generating a document-related image based on content of the original electronic document;
displaying, by the display component, the original electronic document;
recording, by the image capturing component, a real-time video of a user as the user inputs a set of signature strokes that constitute a signature on the input/output module;
generating, by the processor, a superimposition video based on the real-time video and the document-related image, wherein in the superimposition video, the document-related image and a part of the real-time video are superimposed; and
generating, by the processor, an electronic signed document by embedding the superimposition video in the original electronic document.

Another object of the disclosure is to provide an electronic device that is capable of executing the above-mentioned method.

According to one embodiment of the disclosure, the electronic device for creating an electronic signed document from an original electronic document, and includes a processor, an image capturing component connected to the processor, and an input/output module that is connected to the processor, and that includes a display component.

The processor is configured to:
generate a document-related image based on content of the original electronic document,
control the display component to display the original electronic document,
control the image capturing component to record a real-time video of a user as the user inputs a set of signature strokes that constitute a signature on the input/output module,
generate a superimposition video based on the real-time video and the document-related image, wherein in the superimposition video, the document-related image and apart of the real-time video are superimposed, and
generate an electronic signed document by embedding the superimposition video in the original electronic document.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
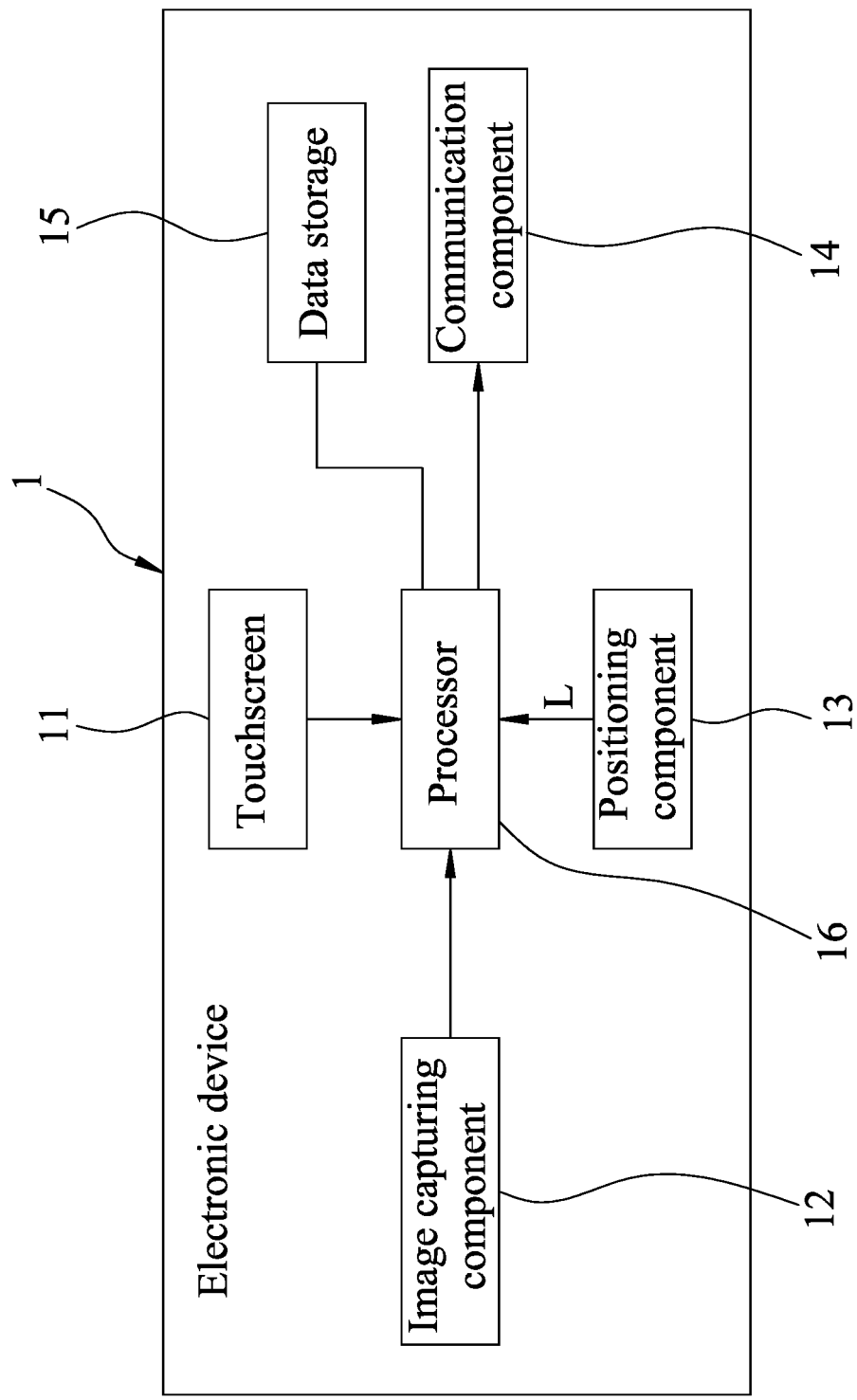
FIG. 1 is a block diagram illustrating an electronic device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 is a block diagram illustrating an electronic device 1 according to one embodiment of the disclosure.

Figure 2:
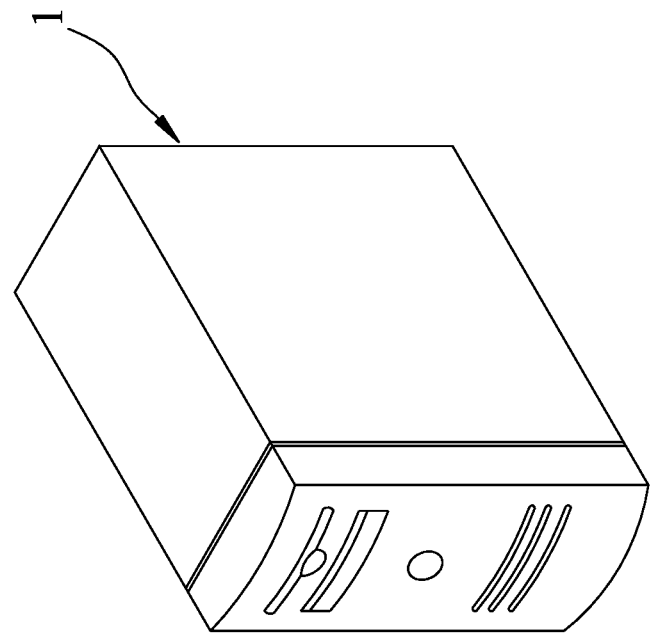
FIG. 2 is a schematic diagram illustrating implementations of the electronic device.
Figure 2:
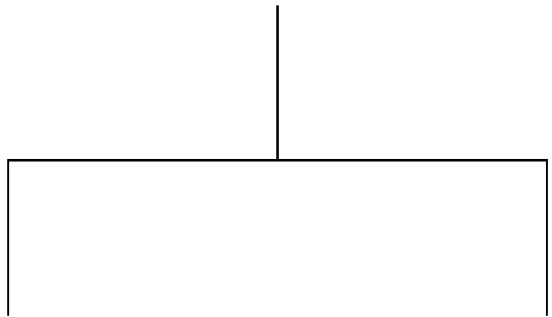
Figure 2:
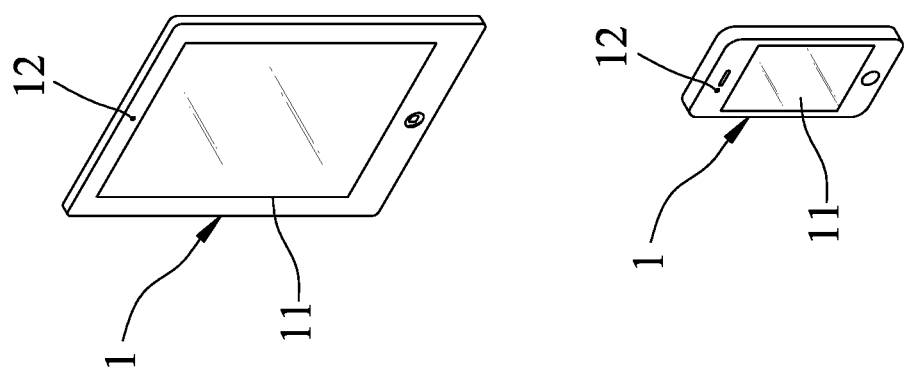

As shown in FIG. 2, the electronic device 1 may be embodied using a personal computer, a laptop, a tablet, a mobile device (e.g., a smartphone), a personal digital assistant (PDA), etc., and includes an input/output module, an image capturing component 12, a positioning component 13, a communication component 14, a data storage 15 and a processor 16 (see FIG. 1).

The input/output module may include an output device such as a display component (e.g., a touchscreen), and an input device such as a writing pad, etc. In this embodiment, the input and output devices are integrated as a touchscreen 11. The image capturing component 12 may be embodied using a physical built-in camera that is built in the electronic device 1 or an external camera connected to the electronic device 1. The positioning component 13 may be embodied using a global positioning system (GPS) component for obtaining a set of location coordinates that indicates a geolocation of the electronic device 1.

The communication component 14 may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

The data storage 15 may be embodied using a non-volatile storage medium such as a hard disk, flash memory, etc. The data storage 15 stores an operating system (OS) of the electronic device 1 and a software application that can be executed by the processor 16, and at least one original electronic document.

The processor 16 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

Figure 3:
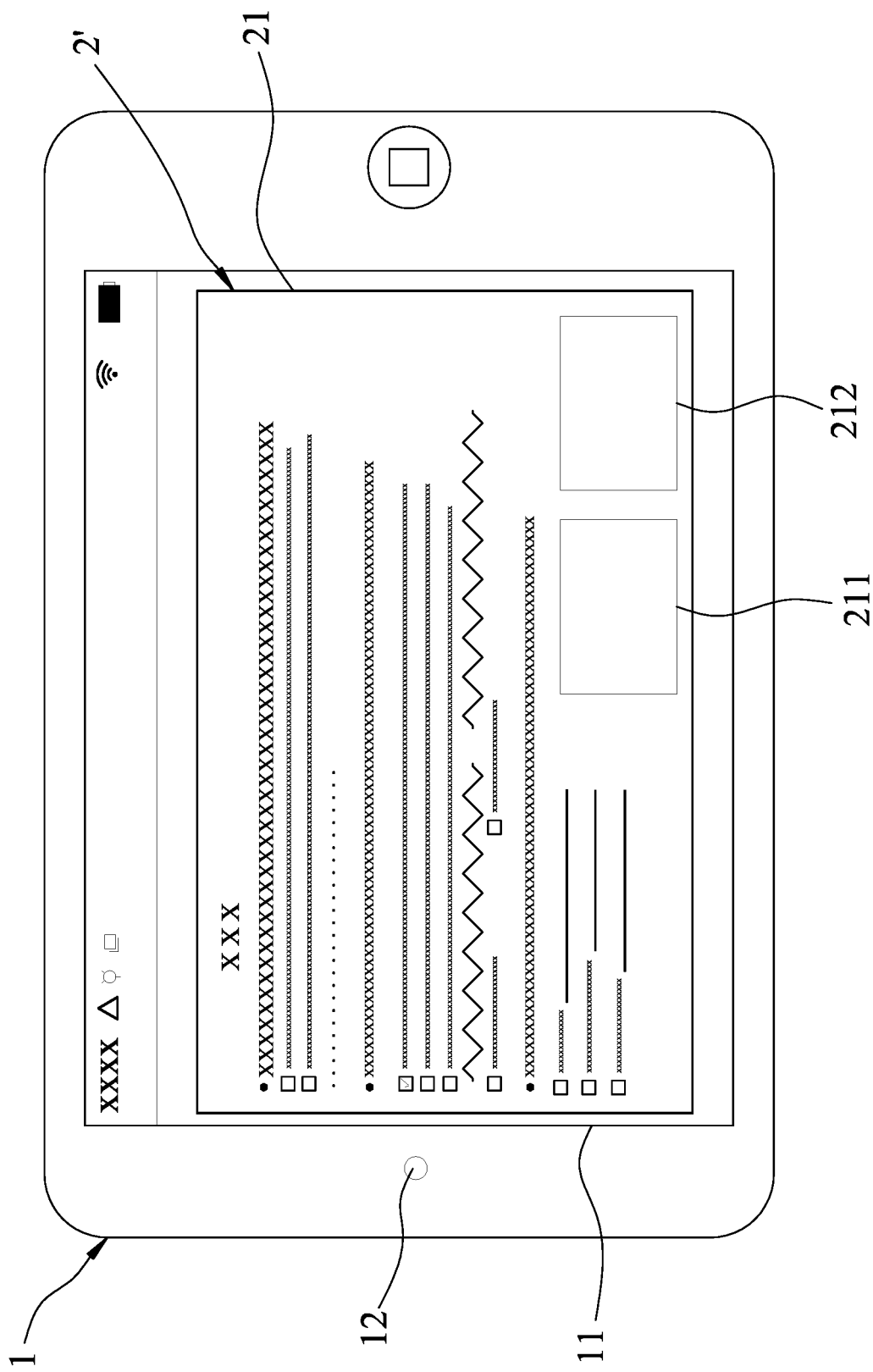
FIG. 3 illustrates an original electronic document displayed on the electronic device.
Figure 6:
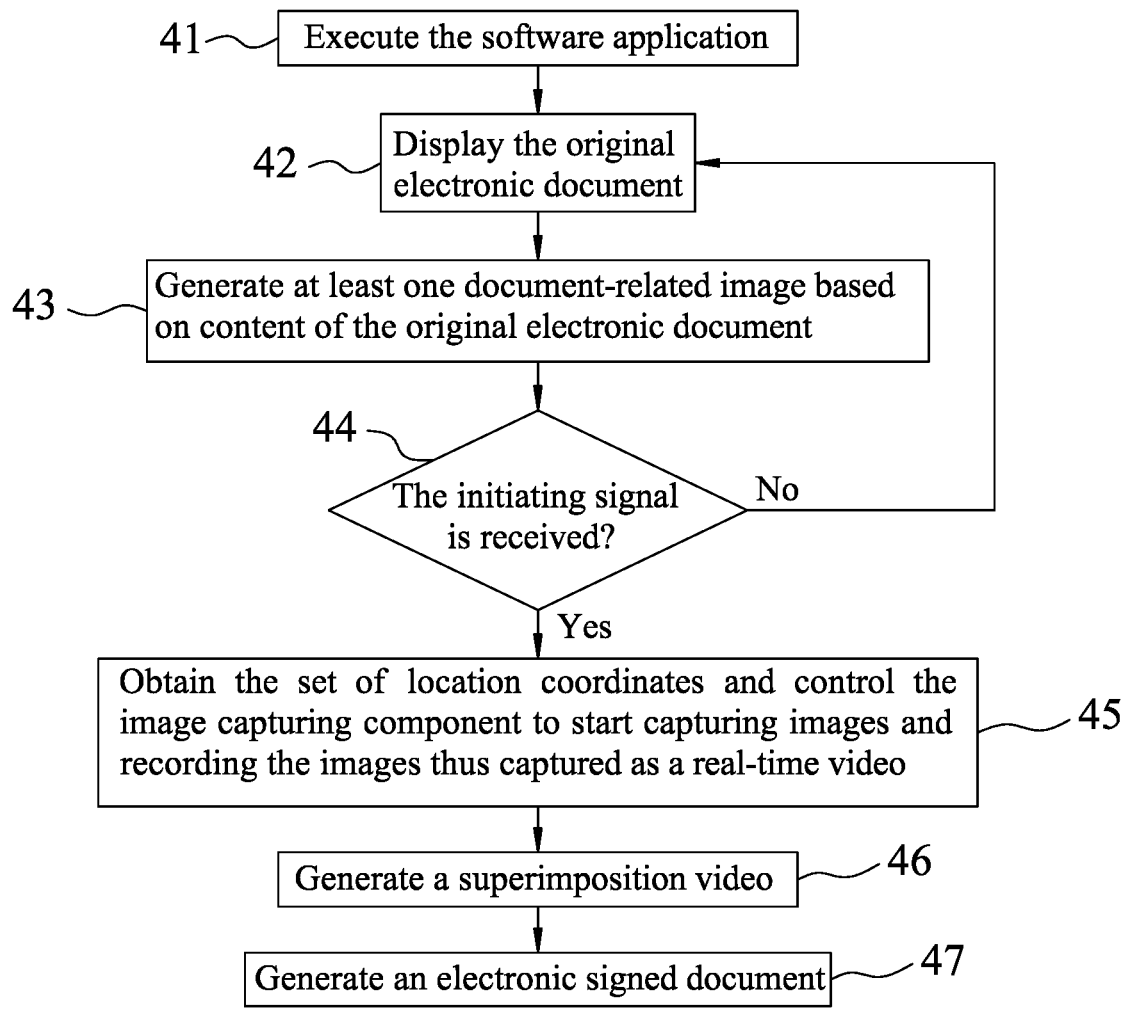
FIG. 6 is a flowchart illustrating steps of a method for creating an electronic signed document according to one embodiment of this disclosure.

FIG. 6 is a flowchart illustrating steps of a method for generating an electronic signed document from an original electronic document. In this embodiment, as shown in FIG. 3, the electronic device 1 is embodied using a tablet, the input/output module is embodied using the touchscreen 11, and when it is desired for a user to "sign" the original electronic document, the user may operate the electronic device 1 to execute the software application in step 41. In response, the processor 16 controls the touchscreen 11 to display the original electronic document 2 in step 42.

In one example as shown in FIG. 3, the original electronic document 2 displayed by the touchscreen 11 includes a signature field 211 and a video field 212. For example, the original electronic document 2 is a contract document having multiple pages (e.g., four), and the signature field 211 and the video field 212 are located on a first page of the original electronic document 2. In a case that the original electronic document 2 needs multiple signatures from different parties, additional signature fields and video fields may be present at various locations/pages in the original electronic document 2.

In step 43, the processor 16 generates at least one document-related image based on content of the original electronic document 2.

Figure 4:
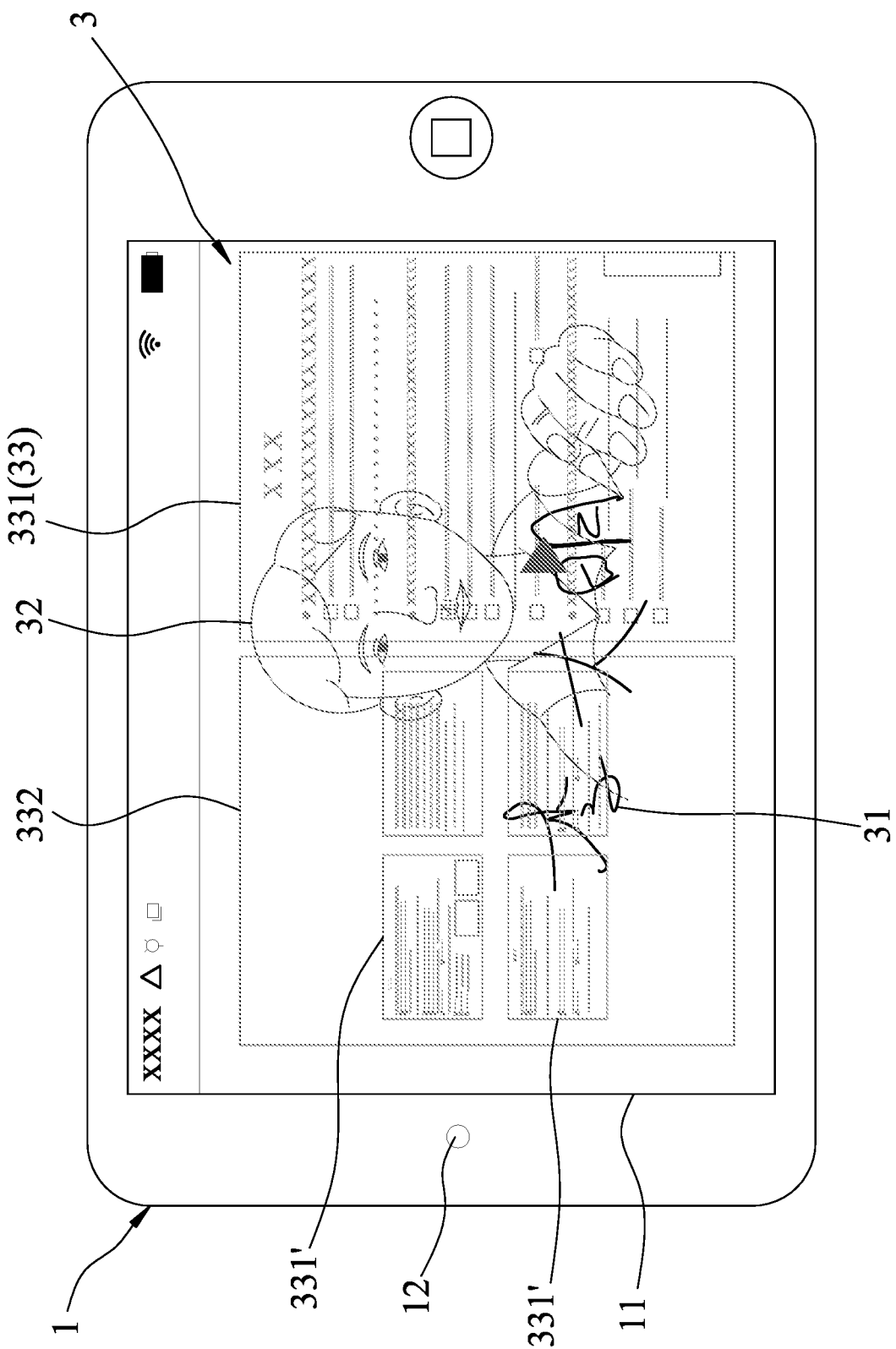
FIG. 4 illustrates an exemplary superimposition video being played on the electronic device.

Referring to FIG. 4, for example, the original electronic document 2 is a contract document having four pages. As such, four document-related images 331 (only one is depicted) are generated. Each of the four document-related images 331 may be a screen capture image of one page of the original electronic document 2, or a part of one page of the original electronic document 2. That is to say, the technique of capturing image used on known electronic devices may be employed.

Additional document-related image(s) may be generated to include other features related to the original electronic document 2. For example, one additional document-related image 332 may include thumbnails 331' respectively of the document-related images 331.

It is noted that, in this embodiment, each of the document-related images 331, 332 may be adjusted to be translucent; that is to say, when one of the document-related images 331 is displayed by the touchscreen 11, the content covered by the one of the document-related images 331 (e.g., a background) can still be visible.

When the user is ready to sign the original electronic document 2, the user may operate the electronic device 1 to input an initiating command associated with the signature field 211 (e.g., by directly touching the touchscreen 11 at a position corresponding to the signature field 211).

The processor 16 determines, in step 44, whether the initiating signal is received. In response to the receipt of the initiating signal, in step 45, the processor 16 obtains the set of location coordinates from the positioning component 13. Otherwise, the processor 16 stands by until the initiating signal is received.

It is noted that in different embodiments, steps 43 and 44 may be carried out in an arbitrary order, or simultaneously.

At this stage, the user (i.e., a signer) is enabled to input the signature in the signature field 211.

In practice, the user inputs a set of signature strokes 31, one stroke at a time, to compose a signature in the signature field 211 using a finger or a stylus pen. Further in step 45, for each stroke of the set of signature strokes 31, the processor 16 receives a representative signal from the touchscreen 11. The representative signal is embedded with a markup language.

For the signature that includes a plurality of signature strokes, the processor 16 receives a plurality of the representative signals respectively representing the plurality of signature strokes 31, and each of the representative signals is embedded with a respective markup language. In this embodiment, the markup language may be selected from Javascript, Java, Swift, Objective C, etc.

Additionally in step 45, as the user inputs the set of signature strokes 31 that constitute a signature in the signature field 211, the processor 16 controls the image capturing component 12 to start capturing images and recording the images thus captured as a real-time video 32. Specifically, in this embodiment, the image capturing component 12 captures at least the face of the signer during the course of the user/signer inputting the set of signature strokes 31.

In this embodiment, the real-time video 32 may be in the form of a streaming media in a format selected from the following: H.263, H.264, flash video (.f4v), Realmedia (.rm), Windows Media Video (.wmv), .m4v, Quicktime File Format (.mov), etc. In this embodiment, as it is being recorded, the real-time video 32 is displayed in the video field 212.

After the user has finished inputting the set of signature strokes 31, he/she may operate the electronic device 1 to input a completion command (e.g., by directly touching the touchscreen 11 at a position corresponding to a complete button).

In response to receipt of the completion command, in step 46, the processor 16 generates a superimposition video 3 based on at least the real-time video 32 and the document-related image (s) 331, and, optionally, the additional document-related image 332. In embodiments, the superimposition video 3 may be generated by superimposing the real-time video 32 with other elements such as the document-related image(s) 331 and/or the additional document-related image 332.

FIG. 4 illustrates an exemplary superimposition video 3 that is generated by the processor 16 and is played on the touchscreen 11. In the superimposition video 3, the document-related images 331, 332 and a part of the real-time video 32 are superimposed.

Specifically, for the example shown in FIG. 4, in the superimposition video 3, one of the document-related images 331 superimposes a part of the real-time video 32 while the real-time video 32 is still visible since the document-related images 331, 332 are translucent, and the set of signature strokes 31 is also incorporated in the superimposition video 3. This may be done by the processor 16 generating a signature file that includes the set of signature stokes 31, and incorporating the signature file in the superimposition video 3. In one implementation, the signature file may be converted into a number of visual elements that can be incorporated into the superimposition video 3, such that when the superimposition video 3 is played, the set of signature strokes 31 are presented.

Additionally, since a large number of document-related images 331 may be present, in order to properly present the document-related images 331 in the superimposition video 3, the superimposition video 3 may be generated to present the document-related images 331 in several ways. For example, each of the document-related images 331 may be configured to be displayed sequentially during playback of the superimposition video 3, in the form of a slideshow. In one example, the superimposition video 3 may be generated such that the document-related image 331 associated with the first page of the original electronic document 2 first appears in the superimposition video 3, fades out after one second, and the document-related image 331 associated with the second page of the original electronic document 2 appears and then fades out, and so forth. In other examples, the document-related images 331 and the additional document-related image 332 (which includes the thumbnails 331') may be arranged to "move" in the superimposition video 3, as if being scrolled by a user, during playback of the superimposition video 3. In the example of FIG. 4, the scrolling movement may be horizontal (e.g., from right to left or from left to right), but may be in other manners, such as vertical (e.g., from top to bottom or from bottom to top), in various examples.

It is noted that the document-related images 331, 332 are configured to be displayed sequentially and cyclically during playback of the superimposition video 3. That is to say, after one of the document-related images 331, 332 that is arranged to be displayed last (e.g., the document-related image 331 associated with a last page of the original electronic document 2) has been displayed, one of the document-related images 331 that is arranged to be displayed first (e.g., the additional document-related image 332) may be configured to be displayed again to restart the loop.

In one embodiment, the processor 16 further determines a duration of the real-time video 32 (e.g., 5 to 10 seconds), and generates the superimposition video in a manner that each of the plurality of document-related images 331, 332 is configured to be displayed sequentially, at least once, within a predetermined time period (which may be shorter than or equal to the duration of the real-time video 32) which falls completely within duration of the real-time video 32 during playback of the superimposition video 3.

After the superimposition video 3 is generated, in step 47, the processor 16 generates an electronic signed document 2' (see FIG. 5) by embedding the superimposition video 3 in the original electronic document 2 (see FIG. 3).

Figure 5:
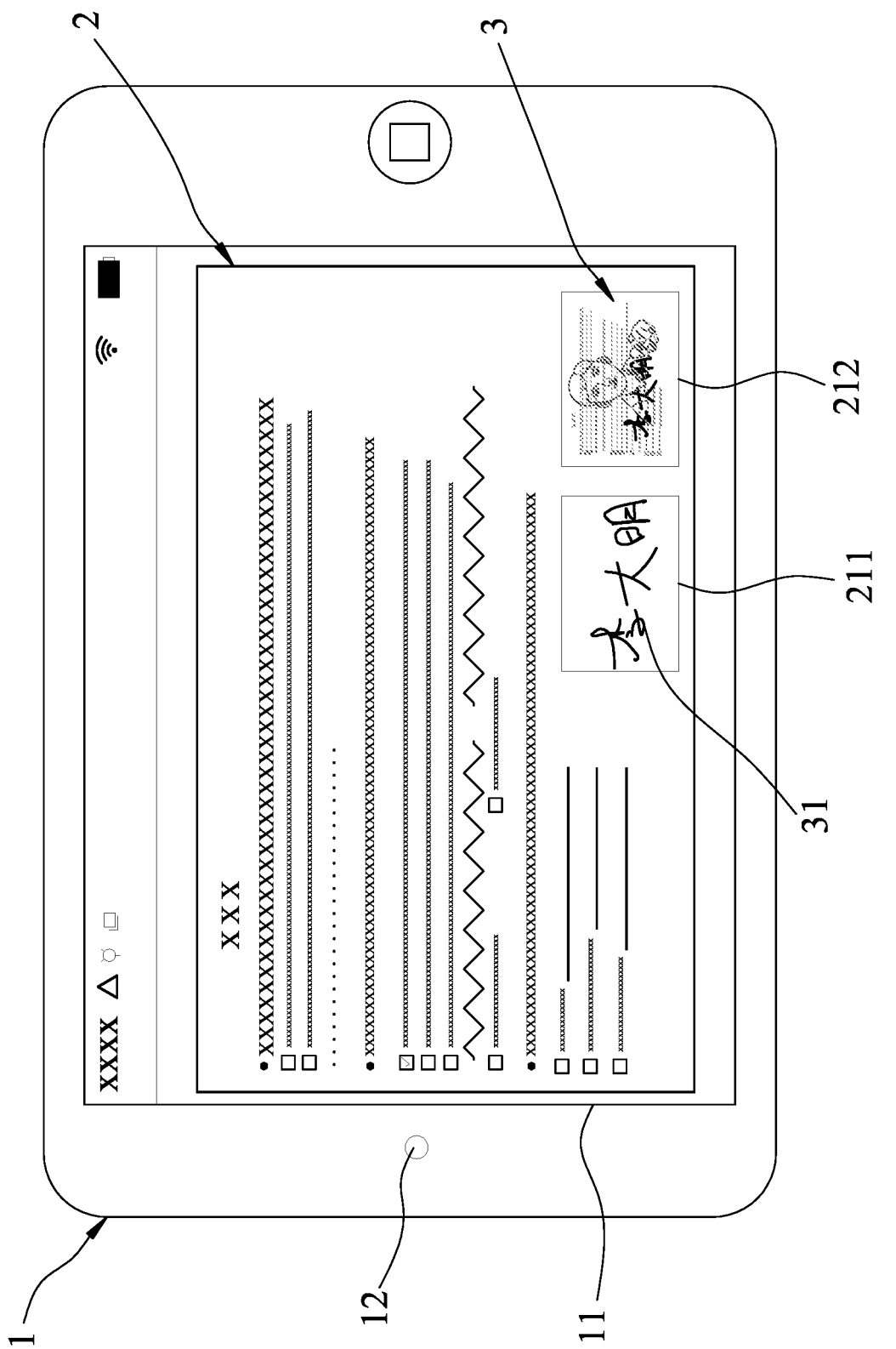
FIG. 5 illustrates an electronic signed document that is generated according to one embodiment of this disclosure.

Specifically, as shown in FIG. 5, the electronic signed document 2' is generated by embedding the superimposition video 3 in the video field 212 of the original electronic document 2. Additionally, the processor 16 further embeds the set of signature strokes 31 in the signature field 211 of the original electronic document 2.

In some embodiments, in step 47, the processor 16 further embeds the set of location coordinates in the original electronic document 2 so as to generate the electronic signed document 2' to have data of the set of location coordinates. The set of location coordinates may be one associated with a current location of the electronic device 1 at which the signing (in step 45) took place, and is obtained using the positioning component 13.

In some embodiments, in step 47, the processor 16 further generates an encryption value, and further embeds the encryption value in the original electronic document 2 so as to generate the electronic signed document 2' to have the encryption value.

For example, the encryption value may be in the form of a hash value that is generated based on one or more of the following parameters: a geolocation of the electronic device 1; a position of the signature field 211 and/or the video field 212 on the original electronic document 2; and one or more values extracted from the signature file.

In this way, a hash value thus generated is different from other hash values when one of the above parameters is altered. It is noted that in other embodiments, additional parameters (such as features of the face of the user, a time point at which the real-time video 32 is recorded) may be incorporated in generating the hash value.

In some embodiments, in step 47, the processor 16 further obtains a time stamp from a time stamp authority (TSA), and embeds the time stamp in the original electronic document 2 so as to generate the electronic signed document 2' to have the time stamp. This is done to serve as verification that the electronic signed document 2' is generated at a specific time as indicated by the time stamp.

To sum up, embodiments of the disclosure provide a method and an electronic device that is capable of generating an electronic signed document 2' that introduces an association among the user, the contents of the original electronic document 2, and the set of signature strokes 31. In this manner, it may be established that the set of signature strokes 31 included in the electronic signed document 2' is signed by the user himself/herself.

Additionally, since the superimposition video 3 includes the set of signature strokes 31, the real-time video 32, and at least a part of the original electronic document 2 (the document-related image(s) 331, and, optionally, the additional document-related image 332), by embedding the superimposition video 3 in the original electronic document 2 as a single element, instead of embedding the above elements in the original electronic document 2 separately, the generation of the electronic signed document 2' may be implemented relatively easily by the electronic device 1 since fewer elements need to be processed.

Moreover, one or more verification measures (e.g., the encryption value, the time stamp, etc.) may be selectively incorporated in the electronic signed document 2' in order to verify that the set of signature strokes 31 included the electronic signed document 2' is signed or inputted by the user himself/herself, in order to enhance the authenticity.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for creating an electronic signed document from an original electronic document, the method to be implemented using an electronic device that includes a processor, an image capturing component and an input/output module including a display component, the method comprising steps of:
    generating a document-related image based on content of the original electronic document;
    displaying, by the display component, the original electronic document;
    recording, by the image capturing component, a real-time video of a user as the user inputs a set of signature strokes that constitute a signature on the input/output module;
    generating, by the processor, a superimposition video based on the real-time video and the document-related image, wherein in the superimposition video, the document-related image and a part of the real-time video are superimposed; and
    generating, by the processor, an electronic signed document by embedding the superimposition video in the original electronic document,
    wherein in the superimposition video, the document-related image is adjustable to be translucent, such that when the document-related image is displayed in the superimposition video and superimposes a part of the real-time video, said part of the real-time video covered by the document-related image is still be visible.

2. The method of claim 1, wherein in the step of generating a superimposition video, the processor further generates a signature file that includes the set of signature stokes, and incorporates the signature file in the superimposition video.

3. The method of claim 1, wherein in the step of generating a document-related image, the processor generates a plurality of document-related images, and one of the document-related images is a screen capture image of the original electronic document.

4. The method of claim 3, wherein each of the plurality of document-related images is a screen capture image of the original electronic document.

5. The method of claim 4, wherein in the step of generating a superimposition video, the superimposition video is generated in a manner that each of the plurality of document-related images is configured to be displayed sequentially during playback of the superimposition video.

6. The method of claim 4, wherein in the step of generating a superimposition video, the superimposition video is generated in a manner that each of the plurality of document-related images is configured to be displayed sequentially and cyclically during playback of the superimposition video.

7. The method of claim 4, wherein in the step of generating a superimposition video, the superimposition video is generated in a manner that each of the plurality of document-related images is configured to be displayed sequentially at least once within a predetermined time period during playback of the superimposition video.

8. The method of claim 3, wherein one of the document-related images includes a thumbnail of the screen capture image of the original electronic document.

9. The method of claim 1, wherein the processor generates the superimposition video in response to the user finishing inputting the set of signature strokes at a signature field on the original electronic document, and further generates a signature file that includes the set of signature stokes, and incorporates the signature file in the superimposition video in a position different from the signature field.

10. An electronic device for creating an electronic signed document from an original electronic document, comprising:
    a processor;
    an image capturing component connected to said processor; and
    an input/output module that is connected to said processor, and that includes a display component,
    wherein said processor is configured to
        generate a document-related image based on content of the original electronic document,
        control said display component to display the original electronic document,
        control said image capturing component to record a real-time video of a user as the user inputs a set of signature strokes that constitute a signature on said input/output module,
        generate a superimposition video based on the real-time video and the document-related image, wherein in the superimposition video, the document-related image and a part of the real-time video are superimposed,
        generate an electronic signed document by embedding the superimposition video in the original electronic document, and
        generate the superimposition video in a manner that the document-related image superimposes a part of the real-time video, wherein in the superimposition video, the document-related image is adjustable to be translucent, such that when the document-related image is displayed in the superimposition video and superimposes a part of the real-time video, said part of the real-time video covered by the document-related image is still be visible.

11. The electronic device of claim 10, wherein said processor is further configured to generate a signature file that includes the set of signature stokes, and to incorporate the signature file in the superimposition video.

12. The electronic device of claim 10, wherein said processor is further configured to generate a plurality of document-related images, and one of the document-related images is a screen capture image of the original electronic document.

13. The electronic device of claim 12, wherein one of the document-related images includes a thumbnail of the screen capture image of the original electronic document.

14. The electronic device of claim 10, wherein each of the plurality of document-related images is a screen capture image of the original electronic document.

15. The electronic device of claim 14, wherein said processor is configured to generate the superimposition video in a manner that each of the plurality of document-related images is configured to be displayed sequentially during playback of the superimposition video.

16. The electronic device of claim 14, wherein said processor is configured to generate the superimposition video in a manner that each of the plurality of document-related images is configured to be displayed sequentially and cyclically during playback of the superimposition video.

17. The electronic device of claim 14, wherein said processor is configured to generate the superimposition video in a manner that each of the plurality of document-related images is configured to be displayed sequentially at least once within a predetermined time period during playback of the superimposition video.

* * * * *